May 29, 1962 R. E. WILLIAMS ETAL 3,037,077

SPEECH-TO-DIGITAL CONVERTER

Filed Dec. 18, 1959 12 Sheets-Sheet 1

INVENTORS.
RICHARD E. WILLIAMS
HAROLD C. GLASS
BY
Thomas & Crickenberger
ATTORNEYS May 29, 1962 R. E. WILLIAMS ETAL 3,037,077

SPEECH-TO-DIGITAL CONVERTER

Filed Dec. 18, 1959 12 Sheets-Sheet 2

May 29, 1962 R. E. WILLIAMS ETAL 3,037,077

SPEECH-TO-DIGITAL CONVERTER

Filed Dec. 18, 1959 12 Sheets-Sheet 3

May 29, 1962 R. E. WILLIAMS ETAL 3,037,077

SPEECH-TO-DIGITAL CONVERTER

Filed Dec. 18, 1959 12 Sheets-Sheet 6

May 29, 1962 R. E. WILLIAMS ETAL 3,037,077

SPEECH-TO-DIGITAL CONVERTER

Filed Dec. 18, 1959 12 Sheets-Sheet 7

May 29, 1962 R. E. WILLIAMS ETAL 3,037,077

SPEECH-TO-DIGITAL CONVERTER

Filed Dec. 18, 1959 12 Sheets-Sheet 12

United States Patent Office 3,037,077
Patented May 29, 1962

3,037,077

SPEECH-TO-DIGITAL CONVERTER

Richard E. Williams, Fairfax, and Harold C. Glass, Falls Church, Va., assignors to Scope, Inc., Fairfax, Va., a corporation of New Hampshire Filed Dec. 18, 1959, Ser. No. 860,389
6 Claims. (Cl. 178—43.5)

This invention relates to speech-to-digital converters, and more particularly to a device which responds to the human speaking voice to transform the spoken words into digital information.

It has been found that human speech is composed of a number of basic sounds called phonemes which may be said to form a speech alphabet in much the same manner as our printed words are composed of basic letters forming a written alphabet. Unfortunately, the problem of speech analysis is complicated by the fact that characteristics such as accent, emotion and other individual peculiarities enter in to add coloration to the basic speech of an individual. Some people who have extreme characteristics in their speech are difficult to understand by other people who are unaccustomed to such characteristics. In these instances, one must become accustomed to such characteristics before they become readily understandable, just as it is often necessary to become accustomed to the handwriting of an individual before it is readable easily.

While the peculiarities of speech of various individuals tend to complicate the analysis of speech into a uniform alphabet of sounds, the problem is by no means impossible of solution. However, it becomes necessary to derive a basic alphabet of sounds or phonemes to which all speech, regardless of individual characteristics, can be made to conform. These sounds or phonemes have dimensions of frequency and time and represent the most elementary approach which can still retain physical meaning.

In accordance with the present invention the frequency spectrum essential to speech intelligibility is divided into a sufficient number of bands (sixteen) to yield to an elementary sound or phoneme analysis without overcomplicating the practical problem of maintaining the circuit hardware components at a minimum. These frequency bands are samplied at a time rate (25 milliseconds) which is great enough to obtain an accurate identification of the energy present in each band while being small enough to prevent the overlooking of any sounds of short duration. The display and comparison of the signals being analyzed with the basic phoneme reference alphabet is accomplished optically, and the phoneme reference alphabet is stored photographically to take advantage of the long memory and high resolution inherent in this medium.

In operation, one arrangement of the present invention utilizes a transducer to convert the sound waves of the voice to electrical energy which is then normalized so that all frequency components present are of nearly equal intensity. The electrical energy is then separated into a plurality of frequency bands, each of which drives a light source to provide an optical indication of the frequency components present in the electrical energy. The light sources thus energized are made to shine through photographically coded images in a code wheel which samples the light display at a speed of forty revolutions per second.

The images on the code wheel are composed in such fashion that a particular sound displayed optically by the lights will be transmitted through the corresponding sound image on the code wheel to give a uniform reference intensity of light on the opposite side of the code wheel. All attempts to match the light pattern display with other sound images will produce a non-uniform intensity of transmitted light. Appropriate sensing and synchronization circuits evaluate the transmitted light signals to select the signal associated with the best available optical match. The selected signal is identified by means of a binary code indication characteristic of each phoneme present on the code wheel. The system is prevented from erroneously repeating a phoneme by means of a continuous comparator which compares each phoneme with the preceding and rejects like comparisons. The output from the system is a digital code byte identifying the phoneme under instant analysis. The term byte as used here and throughout this application designates a plurality of bits of digital information which represent a portion of a complete word.

This arrangement of the invention is illustrated in the accompanying drawings in which:

FIGS. 1 to 6 form a logic diagram of a system in accordance with the invention;

FIG. 7 shows the way in which

Figure 1:
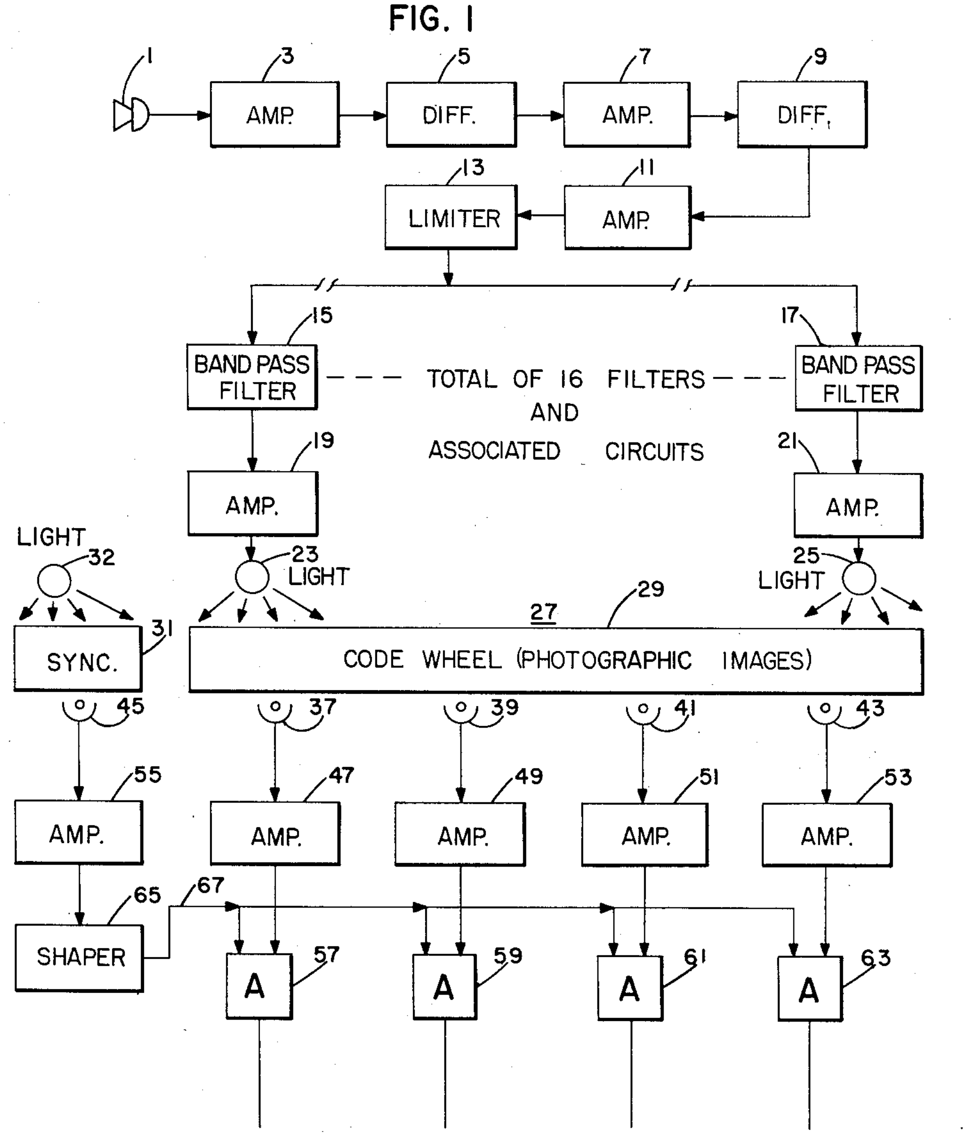
FIGS. 1 to 6 are to be fitted together.
Figure 5:
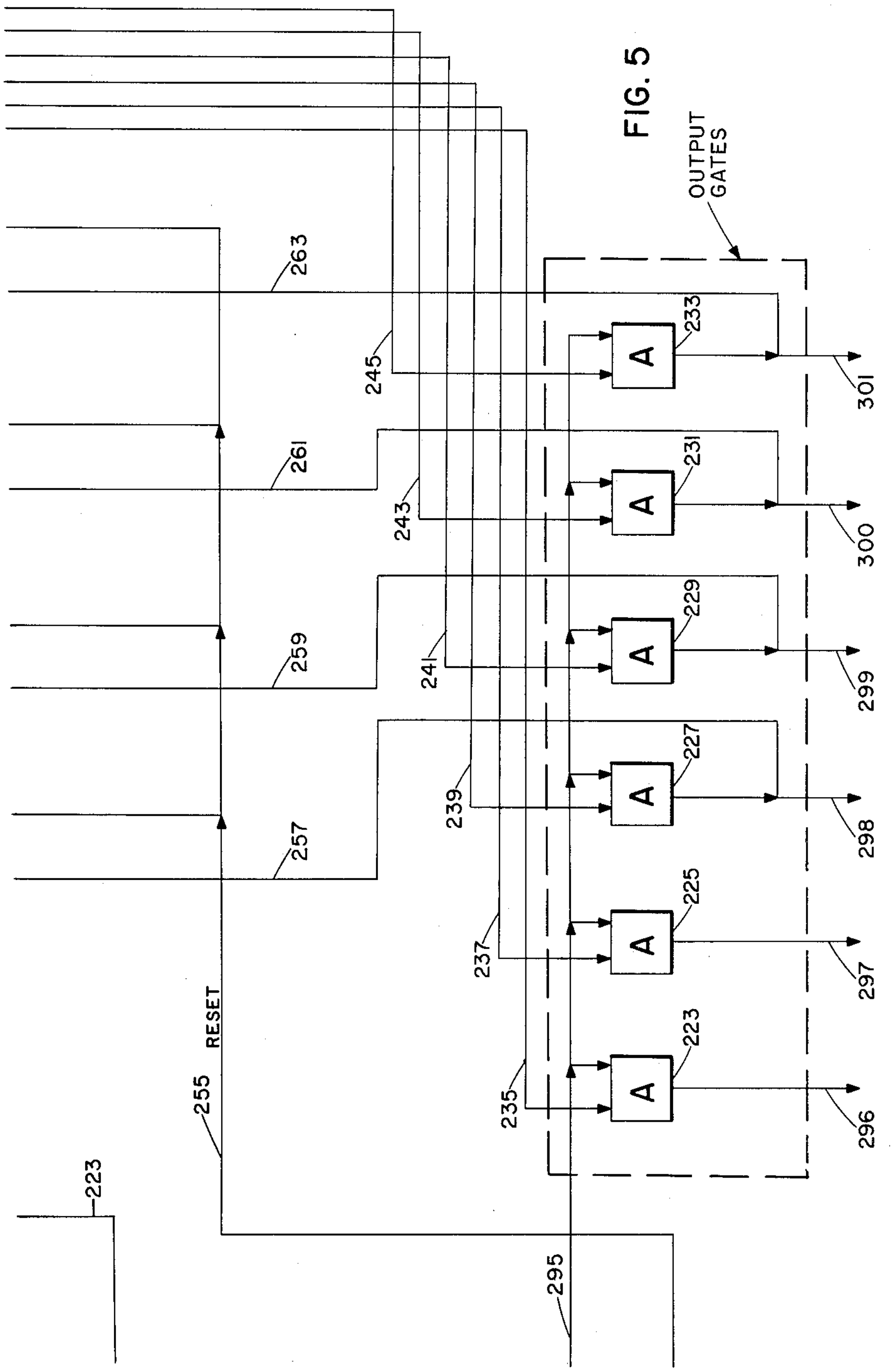
Figure 6:
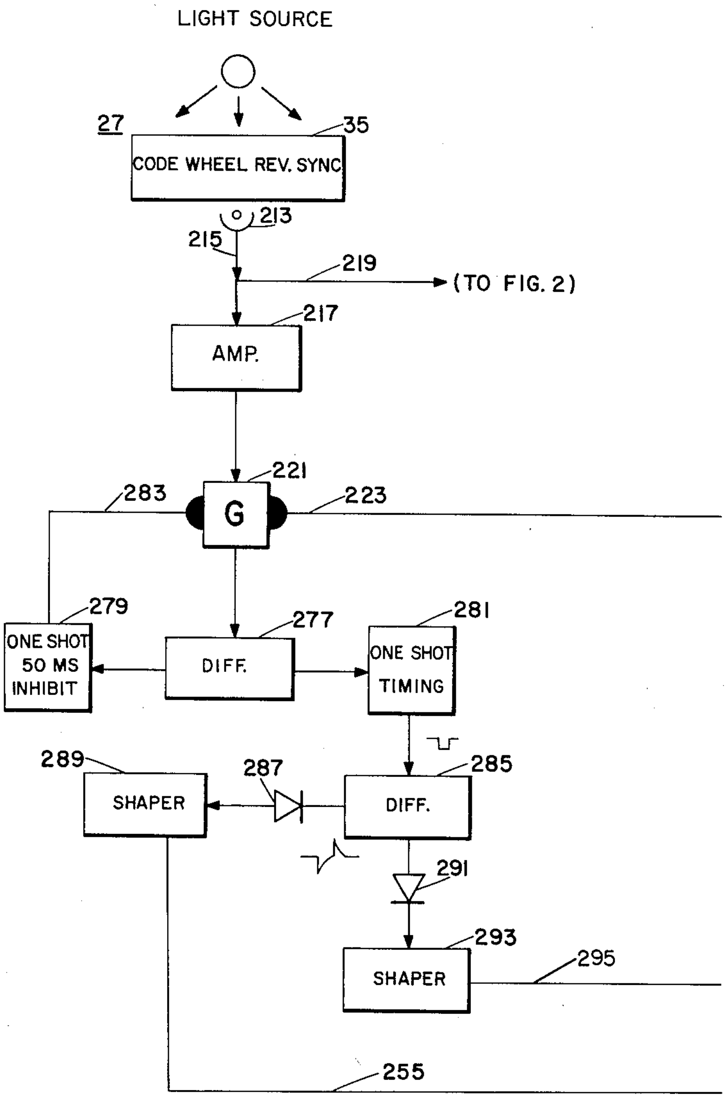
Figure 7:
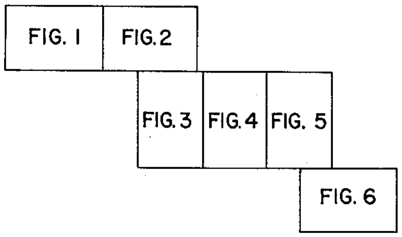

Referring now to the drawings, FIGS. 1 to 6 make up a complete logic diagram of the system when placed together in the positions shown in FIG. 7. FIG. 1 shows the speech input section of the system. The input section includes a microphone 1 which feeds into an amplifier 3, a differentiator 5, another amplifier 7, a second differentiator 9, still another amplifier 11 and finally to a limiter 13. The purpose of these various input circuits is to equalize the energy distribution at the various frequencies of interest prior to analyzing the signal for the presence or absence of such frequencies. It is well known that the energy distribution in speech signals is concentrated at the lower end of the frequency spectrum, and the differentiators 5 and 9 are employed to attenuate these lower frequencies and normalize the energy distribution for all frequencies. The limiter 13 is designed to take effect at a very low signal value to complete the normalization process and insure that the output contains a constant level energy distribution for all received signals regardless of their original amplitude.

From the limiter 13, the signal is fed in parallel to a total of sixteen bandpass filters, only two of which are shown. These filters encompass the spectrum from 75 cycles to 5,000 cycles and are spaced in overlapping relationship in accordance with a Koenig distribution. This distribution gives a smooth overall response, and enables the system to respond to any frequency present within the spectrum of interest. Each of the bandpass filters 15, 17 drives an amplifier circuit 19, 21, respectively, and these amplifiers drive light sources 23, 25. In this manner the presence of a particular frequency or frequencies in the speech signal fed to the bandpass filters produces a corresponding light signal. It will be appreciated from the description of the differentiating and limiting action of the input section that the purpose of that section is to insure, within practical limits, that the lights associated with the bandpass filter circuits will be of uniform intensity when energized. While the ideal condition of uniform intensity seldom obtains, the present system has proved to be satisfactory in indicating the frequencies present.

Figure 14:
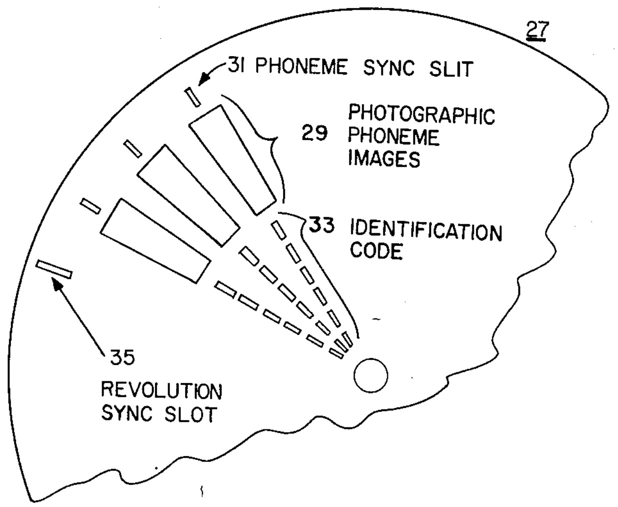
FIG. 14 is a partial view of a code wheel showing a basic layout.

The lights in the bandpass filter circuits are utilized to compare with standard information photographically recorded on a code wheel, generally indicated by the numeral 27, and the photographic image portion of which is denoted by the numeral 29. The function of the code wheel 27 may be understood more easily from FIG. 14 which shows the details of construction. The wheel or disc 27 may be made of plastic or any other material having the required optical and photographic properties. The wheel has photo-etched thereon a pattern of information similar to that shown in FIG. 14. The largest slits 29 contain the photographic phoneme images. Each phoneme image has associated with it a sync slit 31 and six slits 33 which serve to carry the six bit binary identification code for identifying the phoneme. The disc also has a single revolution sync slit 35 which provides an indication of when the code wheel has made a complete revolution.

It has been determined that the average phoneme length is approximately 100 milliseconds. The code wheel 27 is driven at a speed of 40 revolutions per second which means that the average phoneme input will be scanned by the code wheel approximately four times. This leaves an ample margin of operating time as will be seen from the subsequent discussion.

Figure 15:
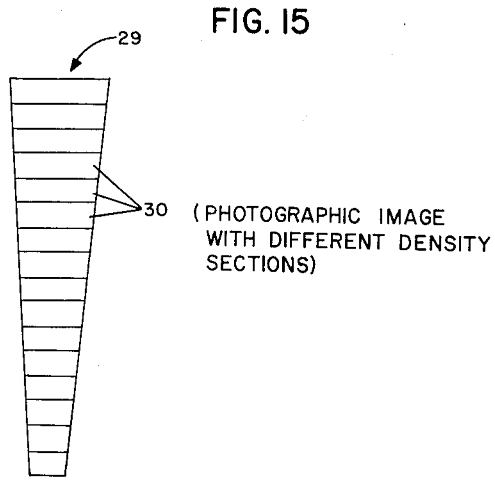
FIG. 15 is an enlarged view of a phoneme image.

FIG. 15 is an enlarged view of a typical photographic phoneme image. The image 29 is made up of a plurality of translucent sections 30 which are individually uniform, but which vary in their degree of translucence in accordance with the particular phoneme represented by the image. The number of sections 30 correspond to the number of bandpass filters employed. A typical code wheel 27 would utilize approximately 40 phoneme images each having sixteen optically coded sections.

On the opposite side of code wheel 27 from the lights are four photosensitive elements 37, 39, 41 and 43 (FIG. 1) associated with the phoneme images 29, and a photosensitive element 45 associated with the phoneme sync slits 31 and light 32, which is constantly energized from a source not shown. The photosensitive elements may be any suitable devices such as silicon cells or photoconductive transistors which would form the input circuit of amplifiers 47, 49, 51, 53 and 55. The outputs from amplifiers 47, 49, 51 and 53 are fed to AND gates 57, 59, 61 and 63, respectively. The output from amplifier 55 is fed to a shaper network 65, the output of which is fed into each of AND gates 57, 59, 61 and 63 along the line 67. Thus, every time a phoneme image passes the bank of 16 lights from the bandpass filter circuits, the associated sync slit 31 activates photosensitive element 45 to produce a pulse which conditions AND gates 57, 59, 61 and 63 along line 67 to allow the output of amplifiers 47, 49, 51 and 53 to pass through.

It will be noted that there are only four photosensitive elements on one side of the code wheel while there are sixteen lights to be matched against the sixteen sections of the phoneme photographic image. In practice it has been found feasible to cover the sixteen band spectrum with four photosensitive pickup elements. In this fashion each of the elements 37, 39, 41 and 43 is reading an average luminosity through a plurality of the sections 30 of the phoneme photographic image. There is no appreciable loss in accuracy with this compromise, and it greatly reduces the complexity of the remaining circuitry.

The photographic phoneme image is coded so that for any given phoneme the pattern of lights from the bandpass filters will match up with the correct phoneme image 29 to give a predetermined reference output to each of the photosensitive elements 37, 39, 41 and 43. In the case of a correct match, these predetermined outputs will all be equal. The encoding process is a trial and error averaging process to establish a reference image which will respond to the same phoneme when spoken by voices having widely different characteristics. For the purpose of describing the system operation it will be assumed that a "reference alphabet" of phoneme images has already been established.

The phoneme images which have been established as the reference images are arranged in chromatic sequence around the code wheel so that similar sounds are coded in adjacent digital bytes. This coding is accomplished by measuring the deviation of one sound from another to establish an anticorrelation table which is used as a guide in assigning the code designations to the sounds. It will be recognized that, when the coding is accomplished in this fashion, an error in identifying a particular sound will not be a critical factor since a close miss in identification will produce a digital byte adjacent to the correct byte, and this error will be automatically compensated for if analog techniques are employed in compiling word groups from the identified phonemes.

Figure 2:
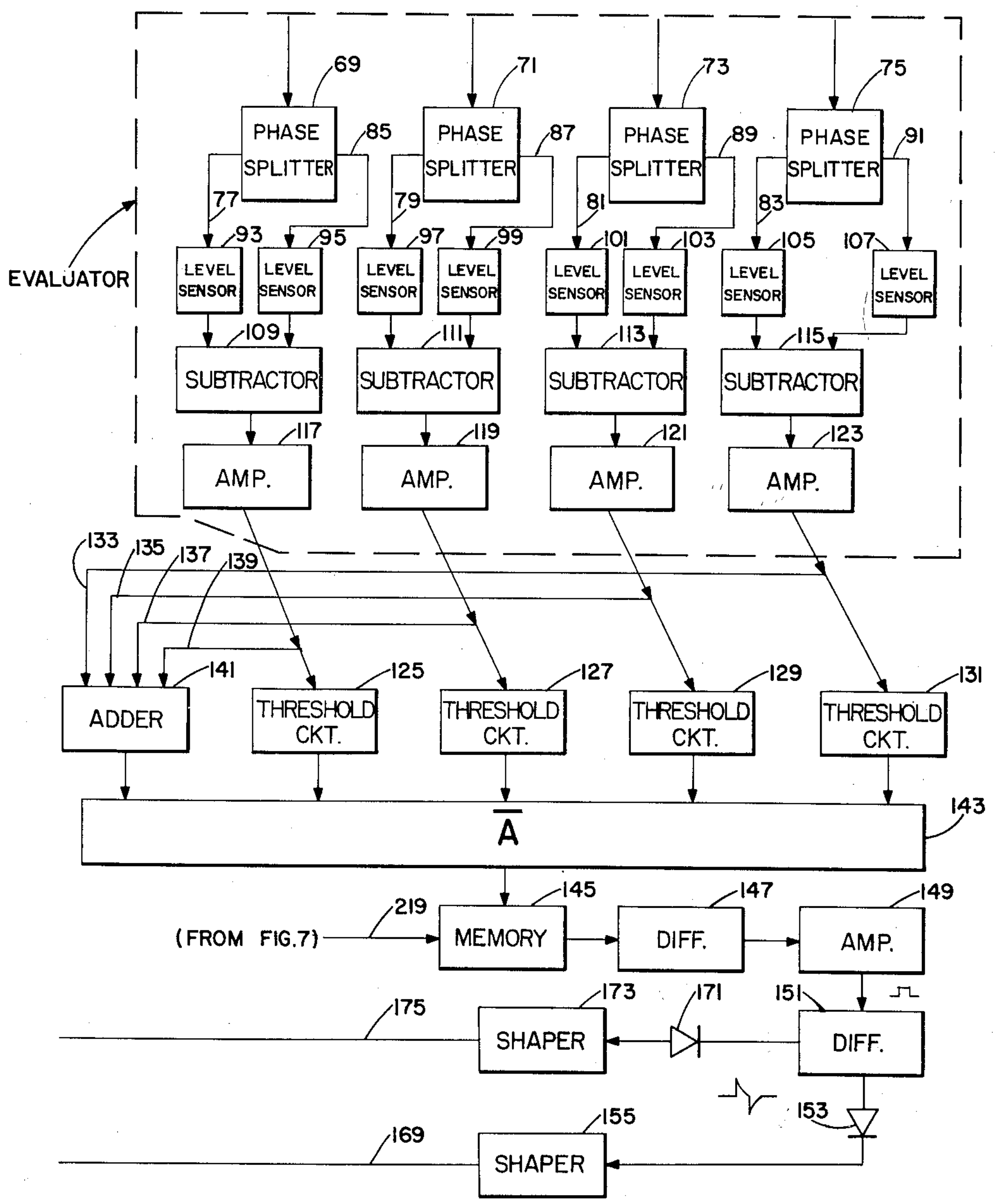
Figure 3:
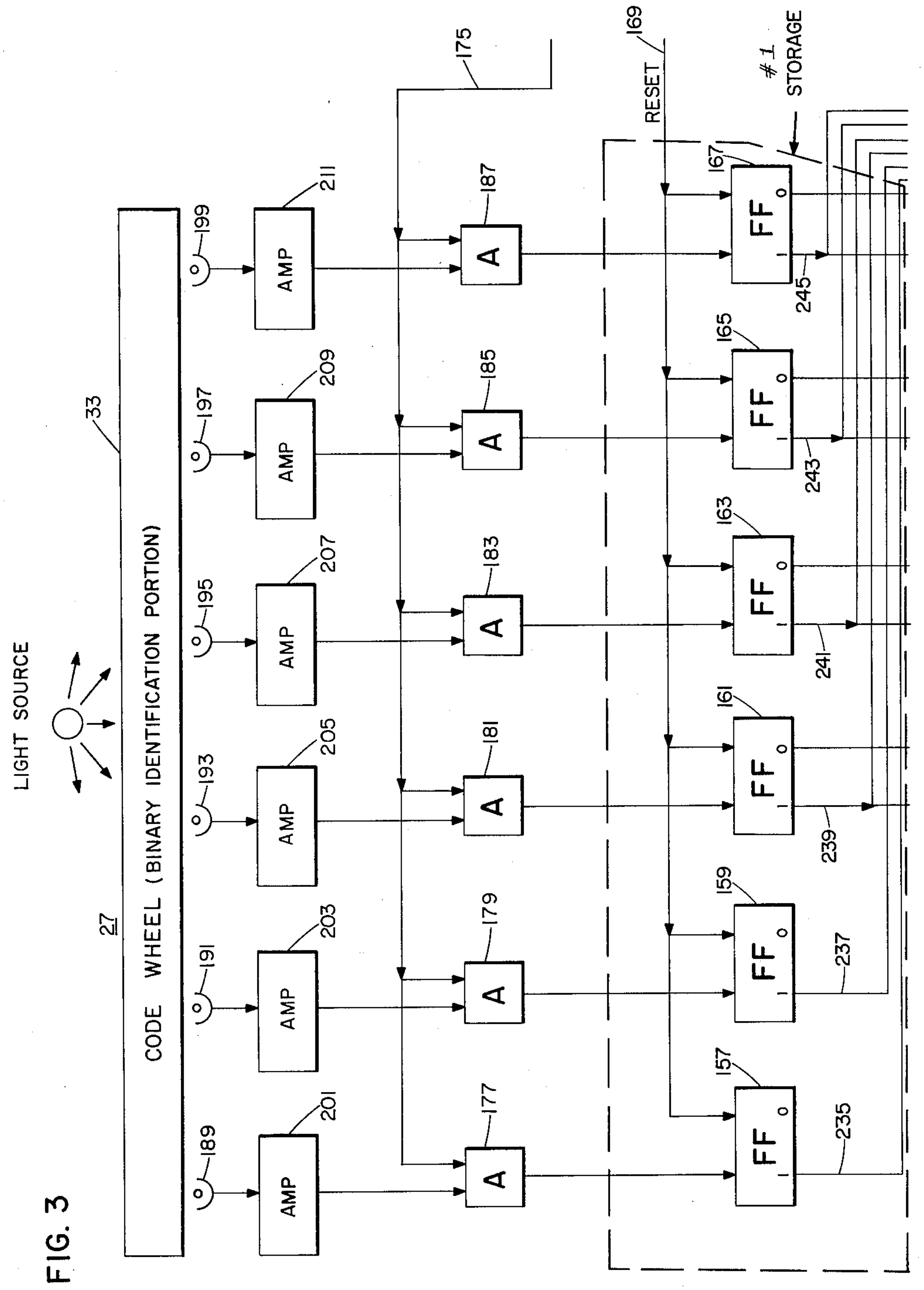

The outputs from AND gates 57, 59, 61 and 63 are fed to phase splitter networks 69, 71, 73 and 75 shown in FIG. 2. Each phase splitter network has two outputs which are 180 degrees out of phase. The signals on lines 77, 79, 81 and 83 are 180 degrees out of phase, respectively, with the signals on lines 85, 87, 89 and 91.

The signals on lines 77, 79, 81 and 83 are fed into level sensor networks 93, 97, 101, and 105 which are designed to pass freely all signals from zero up to a critical value equal to the ideal match voltage signals from the code wheel 27. Lines 85, 87, 89 and 91 are fed into level sensor networks 95, 99, 103 and 107 which are designed to pass only those signals which exceed the critical voltage just mentioned. The outputs from corresponding pairs of the level sensor networks are fed into subtractors 109, 111, 113 and 115. It will be seen that the output of the subtractor networks will be of a value equal to or less than the critical voltage of the level sensor networks.

The subtractor network outputs are fed into amplifiers 117, 119, 121 and 123, and the outputs from these amplifiers are fed into threshold circuits 125, 127, 129 and 131. The amplifier outputs are also sampled along lines 133, 135, 137 and 139 and fed to adder network 141. The outputs from the four threshold circuits are added with the output from adder 141 in a negative AND gate 143. The threshold circuits 125, 127, 129 and 131 are designed so that they will not be energized unless the input signal exceeds a certain minimum value. This minimum value is determined in conjunction with the standard correct match output from code wheel 27 and the critical value voltage of the eight level sensor networks.

When all of the threshold circuits 125, 127, 129 and 131 are energized, the negative AND gate 143 will pass the output of adder 141 to a memory network 145. The signal from adder 141 is stored on a capacitor in memory network 145, and the magnitude of this charge is a direct indication of the accuracy of the photographic phoneme image match with the bandpass filter light display. Since it is possible that during the revolution of code wheel 27 a better phoneme image match might be obtained which would produce a still larger output from adder 141, memory circuit 145 is designed to accept any of such larger signals.

The first signal input to memory 145, as well as each subsequent signal which is larger than the first, will produce an output to differentiator network 147 which is amplified in amplifier 149 and fed to a second differentiator network 151. The leading edge of the pulse from differentiator network 151 passes through diode 153 to a shaper network 155 where the pulse is shaped to reset the six stages of flip-flop circuits 157, 159, 161, 163, 165 and 167 (FIG. 3) along reset line 169. These six flip-flop stages will be referred to as storage register #1. The trailing edge of the pulse from differentiator network 151 passes through diode 171 to a shaper network 173 where the pulse is shaped and is fed along line 175 to condition the inputs of AND circuits 177, 179, 181, 183, 185 and 187 which form the read-in gates for the binary identification code associated with the photographic phoneme image on code wheel 27.

The six slits 33 on code wheel 27 are sensed by photosensitive elements 189, 191, 193, 195, 197 and 199. The signals thus obtained are amplified in amplifiers 201, 203, 205, 207, 209 and 211, and the outputs of these amplifiers are fed to the information inputs of AND gates 177, 179, 181, 183, 185 and 187.

It will be appreciated from the foregoing description that every time a signal is received in memory circuit 145 which increases the charge on the memory capacitor, the AND gates 177, 179, 181, 183, 185 and 187 are conditioned along line 175 to pass the six bit binary identification code sensed by photosensitive elements 189, 191, 193, 195, 197 and 199 into the six flip-flop circuits 157, 159, 161, 163, 165 and 167 of storage register #1.

At the end of a complete revolution of code wheel 27, the storage register #1 will contain the six-bit binary byte identifying the most acceptable phoneme match obtained during that revolution. This will be seen from the fact that the first acceptable match received at memory circuit 145 produces pulses on lines 169 and 175 which first reset the flip-flop circuits of storage register #1 and then gate the six-bit binary identification code in the flip-flops of storage register #1 to identify the acceptable phoneme image. Subsequent better matches of phoneme images during that revolution of the code wheel 27 will produce the same action, so that the end of the revolution will find storage register #1 containing the coded identification of the most acceptable match obtained during that revolution.

FIG. 6 shows the portion of the system controlled by the single sync slit 35 on code wheel 27. At the end of a complete revolution, this slit causes a pulse to be generated in photosensitive element 213 which is fed along line 215 to amplifier 217, and along line 219 to an erase input of memory circuit 145 of FIG. 2. Thus at the end of each revolution, the memory circuit 145 is cleared to receive new phoneme identification signals.

Figure 4:
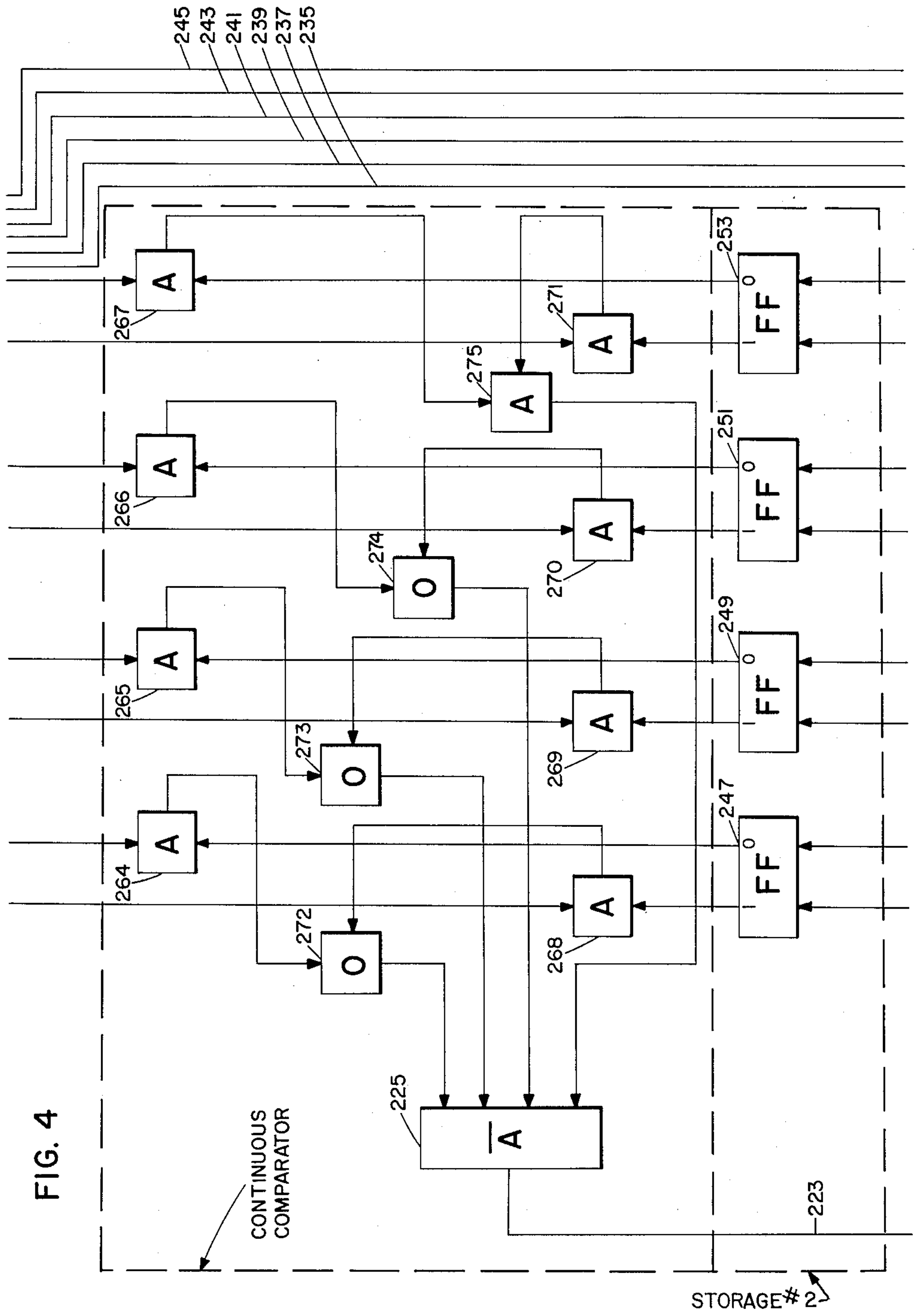

The output of amplifier 217 is fed to gate 221 which has an inhibit input along line 223 from the negative AND gate 225 of FIG. 4. The function of this negative AND gate will be understood best by proceeding with a description of the operation of the storage comparison and output sections of the device shown in FIGS. 3 to 5.

At the end of the complete revolution of code wheel 27 it was established that storage #1 contained the binary code identifying the best phoneme match. The information in storage #1 is also present at the inputs of the output gates 223, 225, 227, 229, 231 and 233 along the output lines 235, 237, 239, 241, 243 and 245 from storage #1. The storage #2 flip-flop circuits 247, 249, 251 and 253 (FIG. 4) contain the four significant bits of the six bit byte identification of the previous phoneme which were set into storage #2 from the output AND gates 227, 229, 231, and 233 (FIG. 5) along lines 257, 259, 261 and 263 as the previous phoneme identification code byte was read out. It is only necessary to retain four bits of the identification code for comparison purposes, since the code is compiled in such a manner that phonemes which are nearly enough alike to be confused are coded so as to be identifiable from four bits of the six bit code. By virtue of this, it will take only four bits to distinguish between phonemes which sound alike while the total six bits will serve to give an absolute identification.

The information in storage #1 is continuously compared with the information in storage #2 to prevent the repetition of a phoneme at the output gates. The continuous comparator section includes AND gates 264 to 267 which continuously compare the Zero outputs of the flip-flop circuits of storage #1 and storage #2, and AND circuits 268 to 270 which continuously compare the One outputs of storage #1 and storage #2. The outputs from AND circuits 264 to 267 are fed to OR circuits 272 to 275, as are the outputs from AND circuits 268 to 271. The OR circuits 272 to 275 make up the four inputs to negative AND circuit 225 which controls the inhibit line 223 to gate 221 of FIG. 6. When negative AND circuit 225 has less than four inputs present, the output line 223 to gate 221 will not act to inhibit gate 221. When four inputs are present at negative AND gate 225, gate 221 will be inhibited. Therefore, when the information in storage #1 is identical to the information in storage #2, indicating that the same phoneme has been sampled again, there will be four inputs to negative AND circuit 225 and gate 221 will be inhibited. When less than four inputs are present, indicating that the same phoneme has not been sampled, the inhibit will be lifted from line 223 and gate 221 will be enabled to pass the pulse from the code wheel sync slit 35.

The output from gate 221 is fed to a differentiator 277 which actuates two one-shot multivibrators 279 and 281. The one shot 279 has a 50 millisecond period and serves to inhibit gate 221 along line 283 for the 50 millisecond interval. This insures that the same phoneme will not be repeatedly sampled during a single occurrence, since the average phoneme length is approximately 100 milliseconds and the first code wheel revolution occurs in 25 milliseconds.

The second one shot 281 produces a negative pulse which is fed to a differentiator network 285. The leading edge of the output pulse from differentiator 285 passes through diode 287 to a shaper network 289, the output line 255 of which is used to reset the flip-flop circuits of storage #2. The trailing edge of the output pulse from differentiator 285 passes through diode 291 to a shaper network 293, and the output line 295 of this shaper network conditions the AND gates 223, 225, 227, 229, 231 and 233 to read out the best match digital identification code which is stored in the six flip-flop circuits of storage #1. The digital code for the best match phoneme identification appears on output lines 296 to 301 where it may be fed into further storage or utilization equipment not described in this application. During the read-out process, the output on lines 298 to 301 is fed back along lines 257, 259, 261 and 263 to flip-flops 247, 249, 251 and 253, respectively, of storage #2 which has just been reset by the pulse along line 255. When the 50 millisecond inhibit signal from one shot 279 is removed, the system is again ready to repeat the sampling, identification and read-out process.

Having finished the description of the system illustrated in FIGS. 1 to 6 of the drawings, it is appropriate at this point to describe in detail the circuits employed in the various blocks illustrated in these figures. The operation of the individual circuits or blocks will be understood more clearly by referring to FIGS. 8 to 13 and 16 to 21 which are schematic diagrams showing the component parts and the manner in which they are interconnected to perform the various functions. It will be understood by those skilled in the art that the particular manner of establishing polarities and reference potentials can be varied as the situation demands, and the embodiments illustrated are by way of example only and are not intended to restrict the mode of operation of the circuitry shown.

Figure 8:
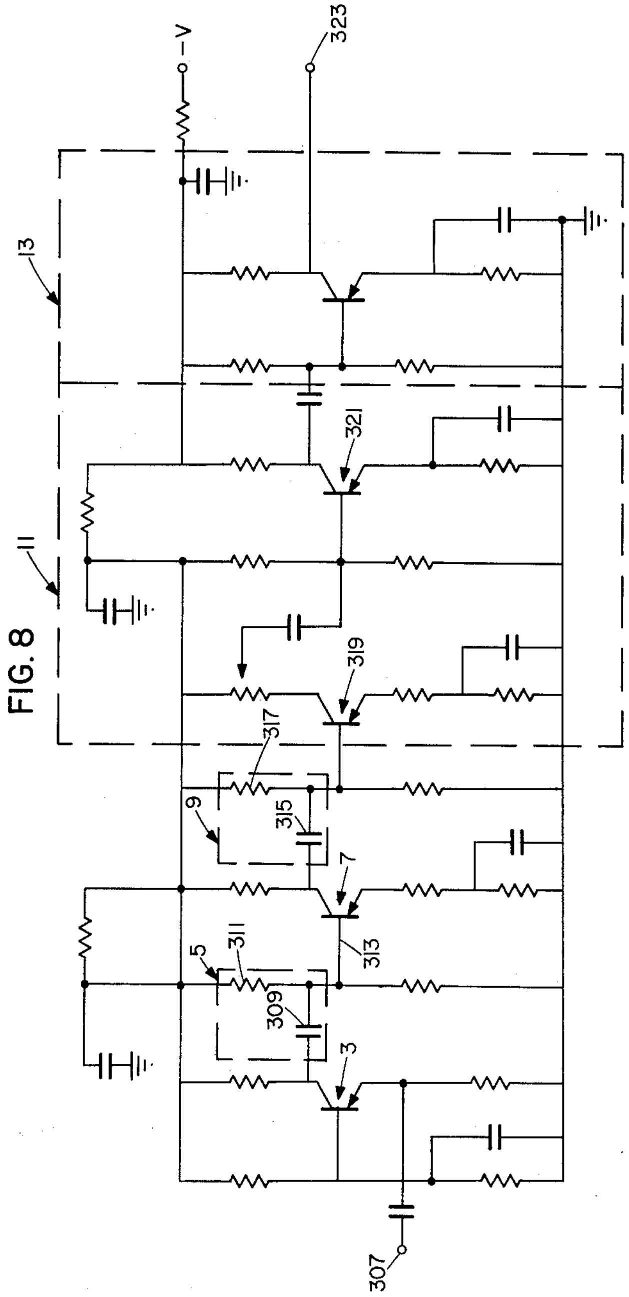
FIG. 8 is a schematic diagram of a portion of the input section of the system shown in FIG. 1.

FIG. 8 is a schematic diagram of a portion of the input section of the system shown in FIG. 1 illustrating the circuit details used to normalize the electrical energy signal. The electrical signal is fed into input terminal 307 to transistor amplifier 3. The output from transistor 3 is differentiated in network 5 composed of condenser 309 and resistor 311. This action attenuates the low frequency components of the signal at approximately six decibels per octave. The differentiated signal is fed to base 313 of transistor 7 where it is amplified and then differentiated again in network 9 comprising condenser 315 and resistor 317. The output from differentiator network 9 is fed into amplifier 11 which includes two transistor stages 319 and 321. The output of amplifier stage 11 is fed into limiter section 13 which severely limits the signal so that the output present at terminal 323 has substantially constant energy levels for all input signals regardless of their original amplitude.

Figure 9:
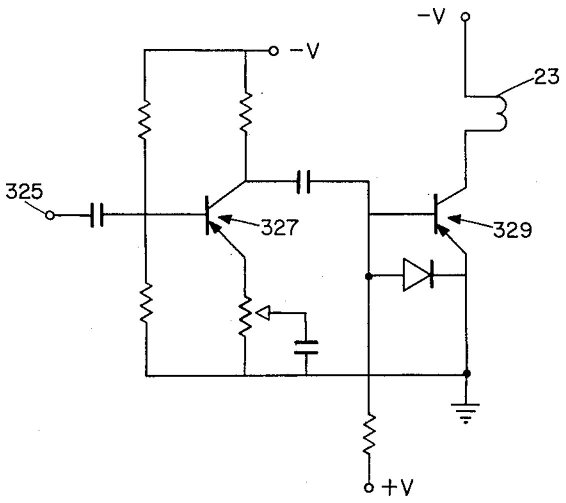
FIG. 9 is a schematic diagram of the circuitry associated with a display lamp shown in FIG. 1.

FIG. 9 is a schematic diagram of the circuitry associated with a display lamp such as the lamp 23 of FIG. 1. The input at terminal 325 is a signal containing a limited band of frequencies which are required to be converted into optical energy by lamp 23. The signal is used to drive two stages of amplification including transistors 327 and 329. Lamp 23 is in the collector circuit of transistor 329 and converts the electrical energy passed by this transistor into light energy for use in conjunction with code wheel 27.

Figure 10:
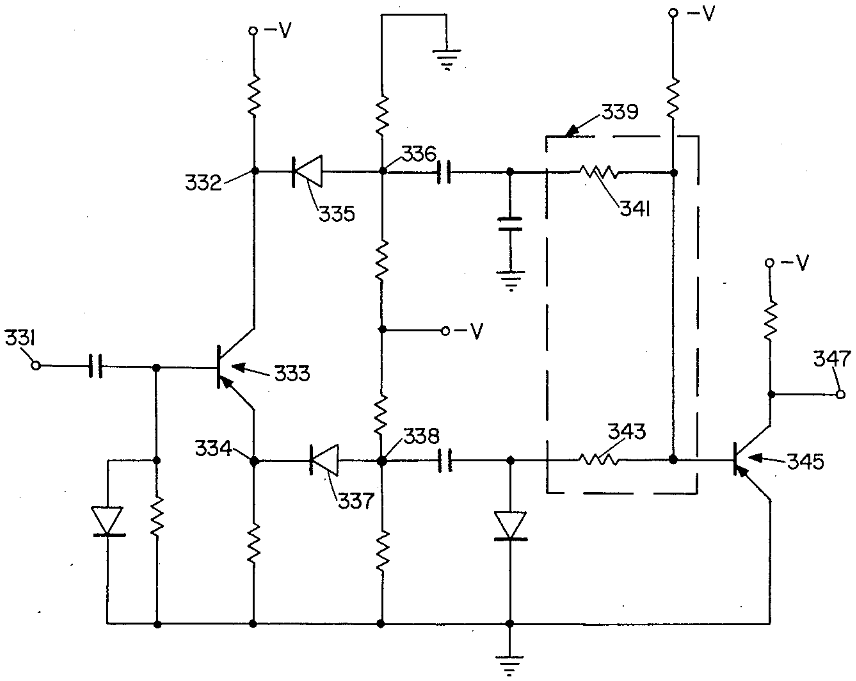
FIG. 10 is a schematic diagram of the evaluator section of the system shown in FIG. 2.

FIG. 10 is a schematic diagram of the evaluator section of the system shown in FIG. 2. Transistor 333 serves as a phase splitter since the signals appearing at points 332 and 334 will be 180 degrees out of phase. Assuming that all values of bias potential —V are equal to 12 volts, then the potentials at points 336 and 338 will be —8 volts and —4 volts, respectively, and the potentials at points 332 and 334 will be —12 volts and 0 volts, respectively. The diode 335 is then forward biased at 4 volts and the diode 337 is reversed biased at 4 volts. Consequently, diodes 335 and 337 constitute level sensor devices, one of which allows only that portion of a signal greater than 4 volts to pass and the other of which allows only signals less than 4 volts to pass. The signals are combined in a subtractor network 339 comprising resistors 341 and 343. The resultant signal is amplified by transistor stage 345, and the output is obtained at terminal 347.

Figure 11:
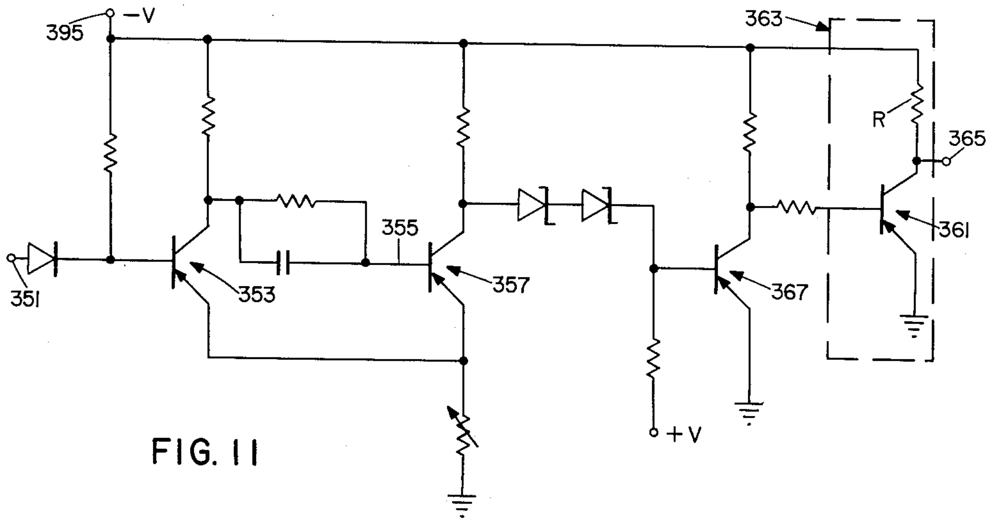
FIGS. 11 and 12 are schematic diagrams of the threshold circuits, adder and associated AND circuit of FIG. 2.

FIG. 11 is a schematic diagram of a threshold circuit including an amplifier stage and one input to the negative AND gate of FIG. 2. Input terminal 351 passes an incoming pulse to the base of transistor 353 which is normally turned on. With transistor 353 turned on, the base element 355 of transistor 357 is at a potential greater than —V, the potential present at terminal 359. When the incoming pulse turns off transistor 353, the base 355 of transistor 357 will go more negative thereby causing transistor 357 to conduct. Transistor 361, included in the input section 363 of negative AND gate 143, is normally saturated thereby clamping output terminal 365 to ground potential. When transistor 357 conducts, this conditions transistor 367 to turn off transistor 361, thereby causing terminal 365 to go negative.

Figure 12:
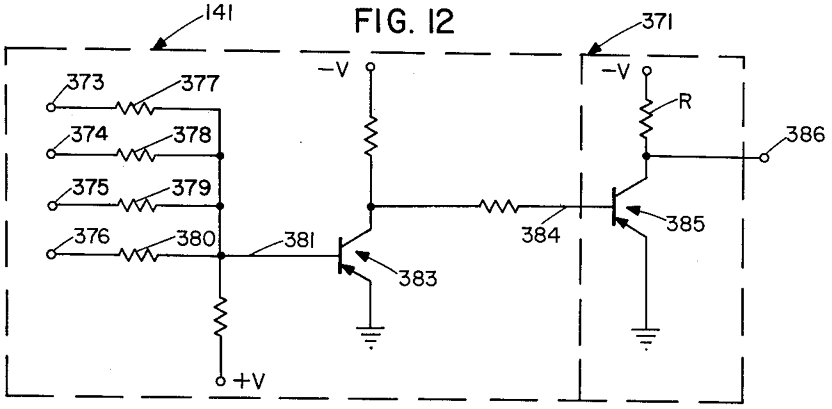

FIG. 12 shows a schematic diagram of the adder 141 and its associated input circuit 371 to negative AND gate 143. Input terminals 373 to 376, which are fed from lines 133, 135, 137 and 139 of FIG. 2, are connected to resistors 377, 378, 379 and 380 which are connected in common to the base element 381 of transistor 383. The mixing produced at base 381, together with the amplification of transistor 383, serve to add the inputs present at terminals 373 to 376. Transistor 385, which is an input circuit to negative AND gate 143 is an amplifier rather than a switch element, and is normally not conducting. The input to base 384 of transistor 385 conditions this transistor, and the output signal on line 386 to AND gate 143 is passed through gate 143 when none of the other inputs, such as transistor 361 of FIG. 11, is clamped to ground potential. Resistor R which appears in FIGS. 11 and 12 is the common collector load for the input circuits to AND gate 143. This AND gate comprises four switch transistors and one amplifier transistor connected in parallel. The switch transistors are normally on thereby clamping the common output to ground potential. When all of the switch transistors are turned off, the output from amplifier transistor 385 is allowed to pass through AND gate 143.

Figure 13:
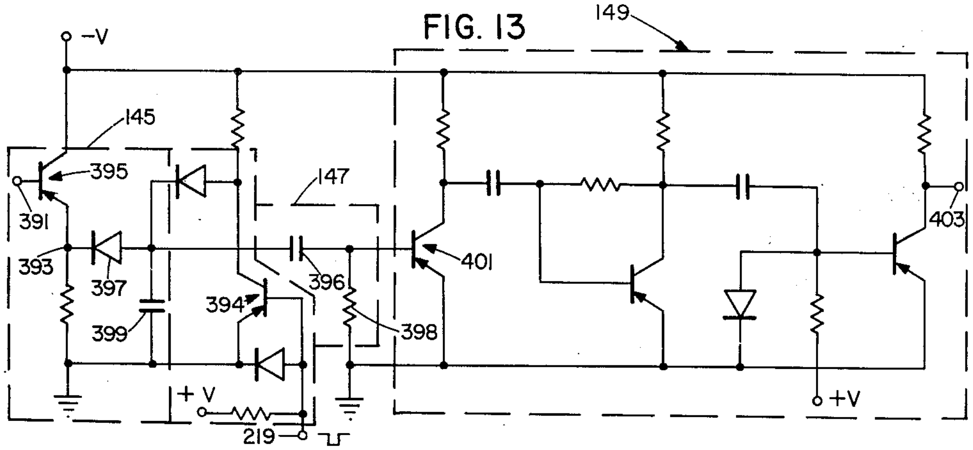
FIG. 13 is a schematic diagram of the memory and associated circuitry of FIG. 2.

FIG. 13 is a schematic diagram of the memory and associated circuitry of FIG. 2. Input terminal 391 receives the negative signal from AND gate 143, and this signal appears at point 393 in the emitter circuit of transistor 395 which behaves as an emitter-follower. The signal at 393 is passed through diode 397 and charges memory capacitor 399. This same signal is also differentiated in network 147 which includes capacitor 396 and resistor 398. The output from this differentiator is amplified in network 149 from the input transistor 401 and appears as an output at terminal 403. When memory capacitor 399 is charged, it serves to bias diode 397 so that any signal of lesser value than the charging voltage will not pass through diode 397. Larger signals, however, will overcome the bias and pass through diode 397 to add additional charge to memory capacitor 399 and produce an additional output at terminal 403. The charge on memory capacitor 399 may be erased by applying a negative pulse at terminal 219 to turn on transistor 394 and complete a discharge path for capacitor 399.

Figure 16:
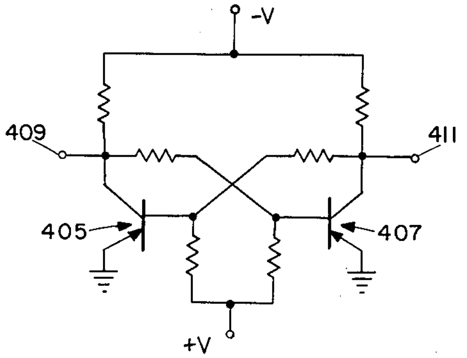
FIG. 16 is a schematic of a flip-flop circuit.

FIG. 16 is a schematic of a flip-flop circuit such as used in storage #1 and storage #2. The device comprises two transistors 405 and 407 having their base and collector elements cross-coupled, respectively. If transistor 405 is turned on, then transistor 407 is turned off because the terminal 409 is then clamped at ground potential making the base of transistor 407 positive. When a negative pulse is applied to the terminal 409 it conditions transistor 407 to turn on and thus clamp terminal 411 at ground potential causing transistor 405 to turn off. In this fashion the transistors may be switched by applying alternate pulses to terminals 409 and 411.

Figure 17:
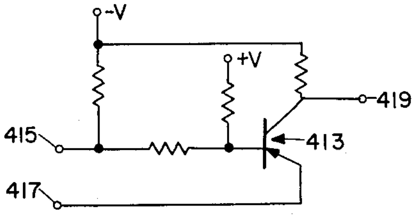
FIG. 17 is a schematic of one form of AND gate.

FIG. 17 is a schematic of one form of an AND gate such as employed in FIGS. 4 and 5. Transistor 413 has input terminals 415 and 417 connected to the base and emitter elements, respectively. Output terminal 419 is connected to the collector element. It can be seen readily that negative pulses are required on both inputs 415 and 417 to produce an output pulse on line 419.

Figure 18:
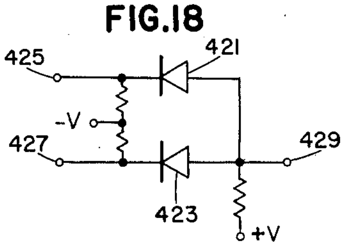
FIG. 18 is a schematic of a second form of AND gate.

FIG. 18 is a second form of AND circuit such as employed in the continuous comparator section of FIG. 4. In this circuit diodes 421 and 423 are biased with potentials to cause conduction in the forward direction. In this particular arrangement it requires positive signals on both inputs 425 and 427 to block conduction of the diodes and cause output terminal 429 to go positive and produce an output pulse.

Figure 19:
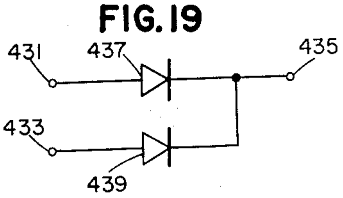
FIG. 19 is a schematic of an OR circuit.

FIG. 19 is a form of OR circuit used in the continuous comparator section of FIG. 4. Positive inputs to either terminal 431 or terminal 433 will cause conduction through diode 437 or 439, respectively, to produce an output at terminal 435.

Figure 20:
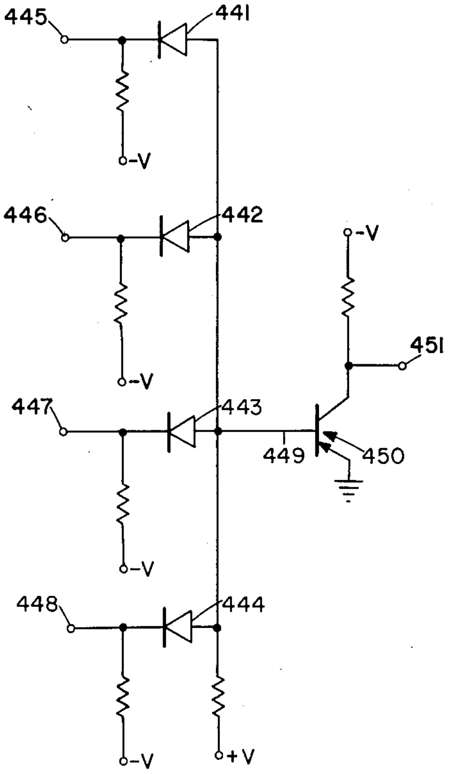
FIG. 20 is a schematic of the negative AND circuit of FIG. 4.

FIG. 20 is a schematic of the negative AND circuit of the continuous comparator of FIG. 4. In this circuit a plurality of diodes 441 to 444 are connected between sources of positive and negative potential in individual fashion. Input terminals 445 to 448 are provided on the negative sides of the diodes, and the positive sides of the diodes are connected in common to the base element 449 of transistor 450. Transistor 450 is normally turned on clamping output terminal 451 at ground potential. When positive pulses are simultaneously received at all four input terminals 445 to 448, the diode conduction paths are blocked and base element 449 goes positive thereby turning off transistor 450 and causing output terminal 451 to yield a negative output pulse. This pulse from terminal 451 is used to inhibit the gate 221 of FIG. 6 in a fashion to be discussed subsequently.

Figure 21:
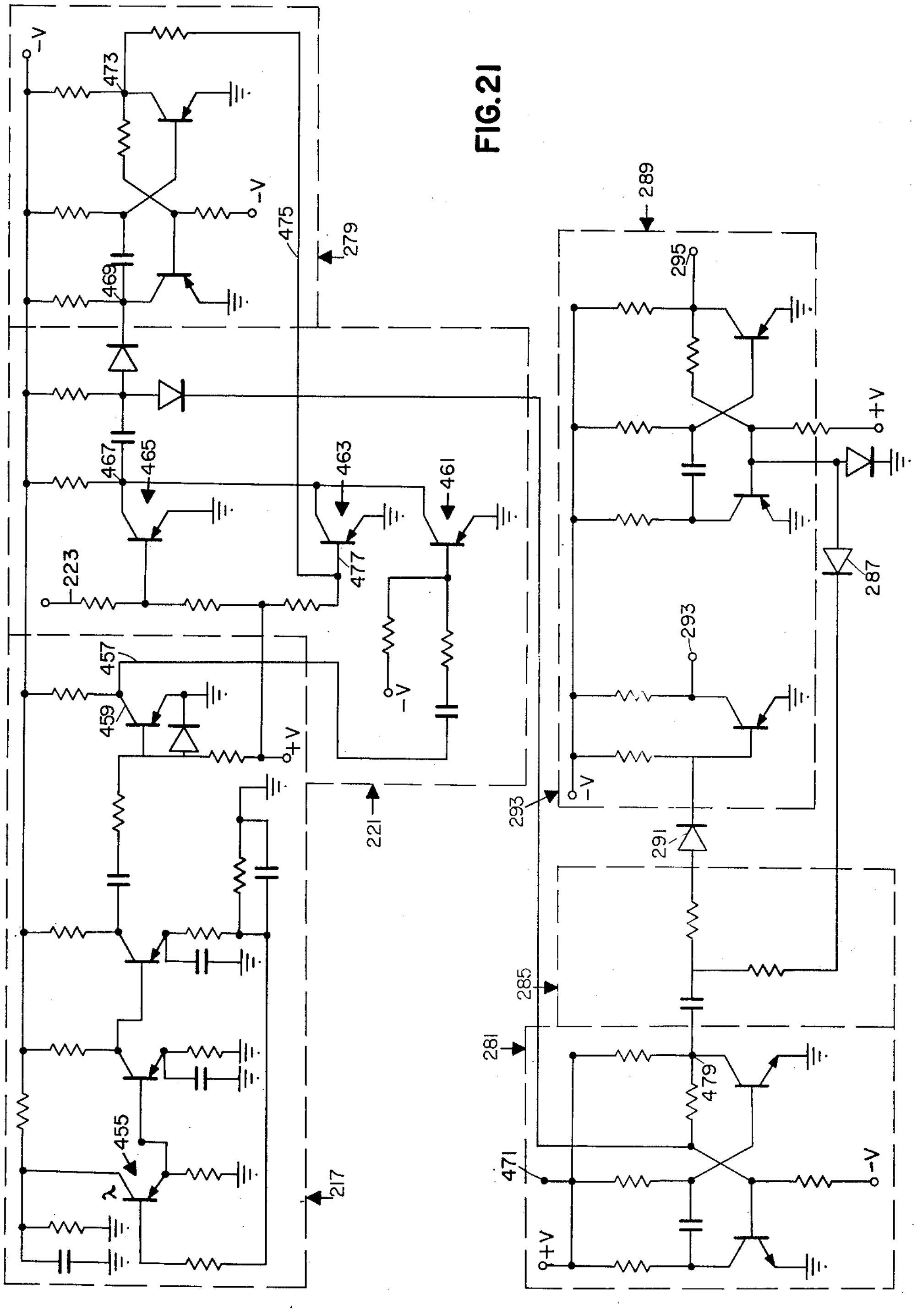
FIG. 21 is a schematic of the logic circuitry of FIG. 6.

FIG. 21 is a schematic diagram of the logic circuitry shown in FIG. 6. The input to amplifier 217 is effected through a photoconductive transistor 455 which is followed by three other transistors in cascade arrangement with the output being taken along line 457 from the collector element 459 of the last transistor. Line 457 constitutes the input to the gate transistor 461, which is normally turned on by virtue of the negative bias potential connected to its base element. Transistors 463 and 465 are connected in parallel with transistor 461, their collector elements being connected together to a source of negative potential. Transistors 463 and 465 constitute the inhibit lines to gate 221 from single shot 279 and negative AND circuit 225, respectively. When either transistor 463 or 465 is turned on, the common collector line is clamped to ground, and any pulse received along line 457 to momentarily turn off transistor 461 will have no effect on the potential at point 467. However, if neither transistor 463 nor 465 were turned on, a pulse on line 457 turning off transistor 461 momentarily would cause the point 467 to go negative, thereby producing an output pulse from this point.

When the gate transistor 461 produces an output pulse at point 467, this pulse is transmitted to points 469 and 471 where it turns on the one shot multivibrators 279 and 281, respectively. One shot multivibrator 279 has a 50 millisecond timing interval which means that a potential will be applied from terminal 473 along line 475 to the base 477 of inhibit transistor 463 to inhibit the gate transistor 461 for a period of 50 milliseconds.

The pulse at terminal 471 of single shot 281, produces an output pulse at point 479 which is differentiated in network 285 and fed through diodes 291 and 287 to shaper networks 293 and 289, respectively. The outputs 293 and 295 from these shaper networks are used to condition the flip-flops of storage #2 and the read-out gates as explained previously.

It will be appreciated from the foregoing description that a speech-to-digital converter has been provided which has a minimum number of components, thereby keeping the power consumption and space requirements within desirable limits. The action of the converter is instantaneous and the converter may be used to establish its own phoneme images, compensating for any idiosyncrasies or aberrations in its operation. This would be accomplished by using unexposed sensitized phoneme images and appropriately shuttering the lamps from the bandpass filter circuits to expose the desired image on the sensitized blank. Since an optical system is employed, extremely long life can be expected from the perception elements of the system.

While the invention has been illustrated and described in one arrangement, it is recognized that variations and changes may be made therein without departing from the invention as set forth in the claims.

What is claimed is:

1. A speech-to-digital converter comprising a transducer for converting acoustic energy to electrical energy containing a plurality of different frequency components, means for separating said electrical energy into different frequency bands, means for converting and optically displaying the electrical energy in each frequency band, a wheel member having a plurality of radially positioned photographic images with sections of different densities representative of particular speech sounds, said wheel member being positioned for individual comparison of said photographic images with said means for optically displaying the electrical energy, means for measuring the degree of match between each photographic image and said means for optically displaying the electrical energy, means for selecting only those matches which fall within predetermined limits of acceptability, and means for indicating which of the selected group is the best match available.

2. The combination according to claim 1 wherein each of said photographic images has associated therewith indicia for identifying the particular image.

3. The combination according to claim 2 wherein the means for indicating the best match includes a first storage register for storing a binary identification code byte representing the reference images falling within the limits of match acceptability, a second storage register, a continuous comparator for comparing the information in the first and second storage registers, read-out gates for reading out the information from the first storage register when the first and second registers do not compare, means for inhibiting the read out operation when a comparison does exist, and means for setting the information read out into the second storage register for later comparison.

4. A speech-to-digital converter comprising a transducer for converting acoustic energy to electrical energy containing a plurality of different frequency components, means for separating said electrical energy into different frequency bands, means for converting and optically displaying the electrical energy in each frequency band, a wheel member having a plurality of radially positioned photographic images with sections of different densities representative of particular speech sounds, each of said images having suitable indicia associated therewith for purposes of identification, said wheel member being positioned for individual comparison of said photographic images with said means for optically displaying the electrical energy, a plurality of photosensitive devices positioned to provide outputs in accordance with the degree of match of the optical display and the photographic images, means for selecting only those outputs which fall within a predetermined range of acceptability, means for combining the selected outputs into a single output, means for selecting the most acceptable single output from a series of single outputs, and means for identifying the most acceptable ouput selected.

5. The combination according to claim 4 wherein the means for identifying the most acceptable output includes a storage register for receiving coded information identifying each photographic image as a comparison is made, said register retaining such coded information until a more acceptable comparison is made, whereby when the comparison operations have been completed said register will contain the information identifying the most acceptable comparison of the group.

6. A speech-to-digital converter comprising a transducer for converting acoustic energy to electrical energy containing a plurality of different frequency components of unequal intensities, means for normalizing the different frequency components of unequal intensities, means for separating said electrical energy into different frequency bands, means for converting and optically displaying the electrical energy in each band, a source of optical reference images corresponding to the speech sounds of interest, means for measuring the degree of match of the optical display with the reference images, a first storage register for storing a binary identification code byte representing the reference images falling within the limits of match acceptability, a second storage register, a continuous comparator for comparing the information in the first and second storage registers, read-out gates for reading out the information from the first storage register when the first and second registers do not compare, means for inhibiting the read out operation when a comparison does exist, and means for setting the information read out into the second storage register for later comparison.

References Cited in the file of this patent

UNITED STATES PATENTS

| | | |
|---|---|---|
| 2,403,983 | Koenig | July 16, 1946 |
| 2,646,465 | Davis | July 21, 1953 |
| 2,699,464 | Toro | Jan. 11, 1955 |